Nov. 5, 1957 C. L. WELLIVER 2,812,472

PULSE EDGE BRIGHTENING CIRCUIT

Filed March 3, 1954

INVENTOR.
CLARENCE L. WELLIVER,
BY Nicholas T Volsk
HIS ATTORNEY.

United States Patent Office 2,812,472

Patented Nov. 5, 1957

2,812,472

PULSE EDGE BRIGHTENING CIRCUIT

Clarence L. Welliver, Los Angeles, Calif., assignor to Hughes Aircraft Company, Culver City, Calif., a corporation of Delaware Application March 3, 1954, Serial No. 413,829

5 Claims. (Cl. 315—22)

This invention relates to cathode ray tube displays of pulse type signals which go through sharp transitions from one amplitude to another, and in particular to a means for brightening the beam of the cathode ray tube to provide greater visibility of the transitory portion of the pulse signals.

When displaying any rectangular pulse on the cathode ray tube screen of an oscillograph the time periods during which the pulse rises from zero amplitude to a maximum and that during which it falls again from the maximum to zero are extremely short compared to the duration of the maximum or top portion of the pulse. Accordingly, the rising and falling portions of the pulse appear less bright than the top portion and frequently, only the top portion is visible.

In the present invention, circuit means are provided by which the intensity of the cathode ray beam is increased during a period of rapid deflection of the beam. This compensates for the shorter time during which the beam impinges upon any unit area of the fluorescent surface of the cathode ray tube during the rapid deflection of the beam.

In this way the beam will be made to produce a visibly bright trace on the fluorescent screen regardless of the instantaneous rapidity with which the beam is deflected across the screen.

Accordingly, it is an object of this invention to provide a circuit with which the intensity of a cathode ray beam may be increased when a more rapid deflection of the beam takes place.

It is also an object of this invention to provide a circuit means whereby the leading and trailing edges of pulses may be displayed on cathode ray oscillograph screens with a brightness consistent with the tops thereof.

Figure 1:
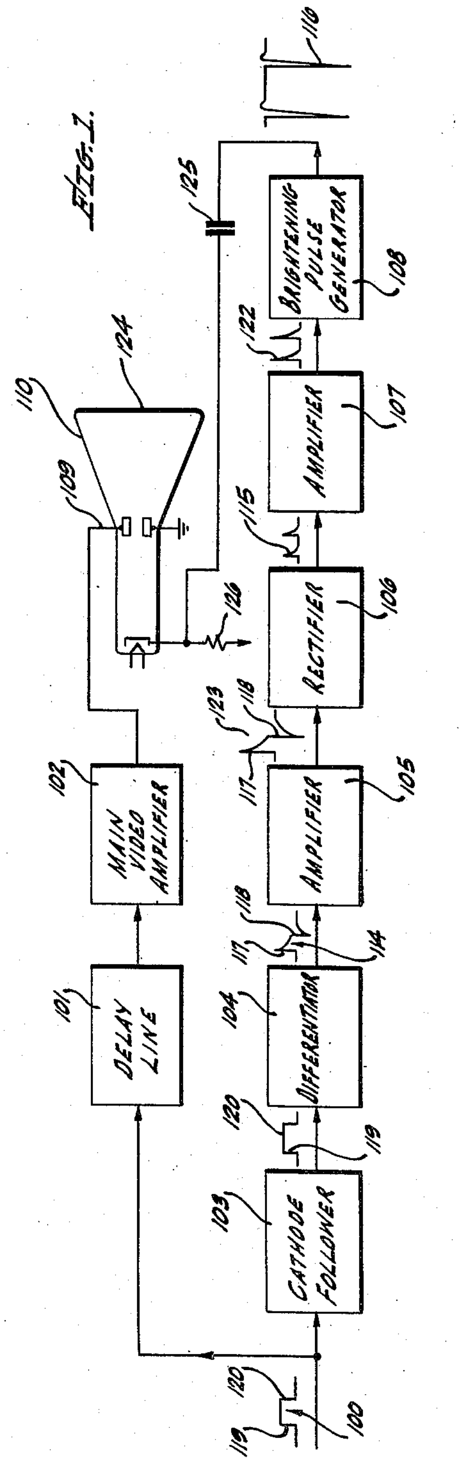
Figure 2:
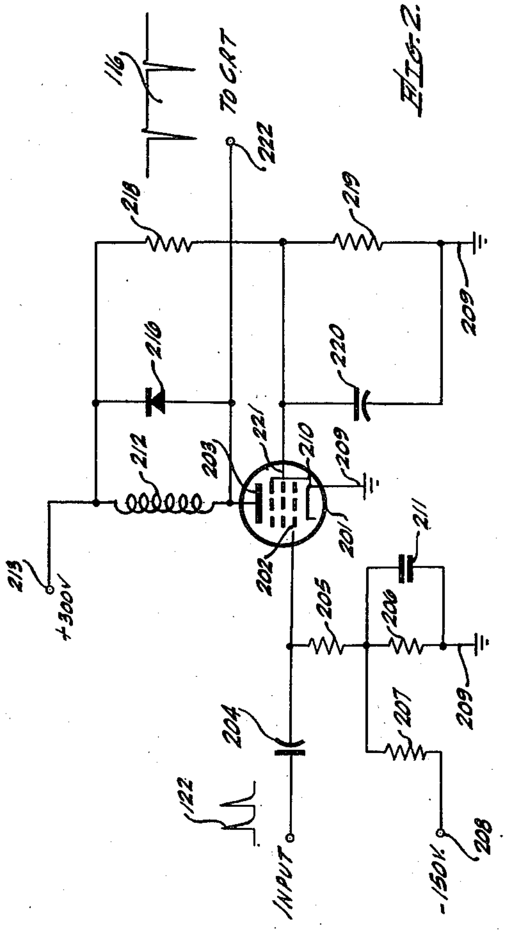

The novel features of this invention, and other objects and advantages thereof will become apparent from the specification which follows and from the accompanying drawings in which:

Fig. 1 is a block diagram of the pulse edge brightening system of this invention as applied to a cathode ray oscillograph, and Fig. 2 is a circuit diagram showing details of the components of the pulse edge brightening feature of this invention.

Referring to Fig. 1 the block diagram of the pulse edge brightening system of this invention is shown.

From a source of rectangular pulses, not shown, a pulse such as 100 is derived. This pulse 100 is applied simultaneously by means of a common input circuit to a delay line 101, and a cathode follower 103. The output circuit of delay line 101 is connected to the input circuit of a video amplifier 102. The output circuit of video amplifier 102 is connected to a deflection signal input circuit 109 of a cathode ray oscillograph tube 110. The cathode ray tube 110 is energized by appropriate deflection generators and anode and filament potentials the sources of which are not shown in the figures.

The output circuit of cathode follower 103 is coupled to a differentiating network shown by block 104. The differentiating network 104 comprises a series capacitor and shunt resistor. The differentiated signal terminals of network 104 are coupled to the input circuit of an amplifier 105. The output circuit of amplifier 105 is connected to a full wave rectifier 106. Rectifier 106 has an output connection to an amplifier 107 which is in turn connected to the input circuit of a brightening pulse generator 108. The output circuit of the brightening pulse generator is coupled to the cathode 111 of the cathode ray oscillograph tube 110 through a coupling capacitor 125 and resistor 126.

The circuit diagram of the brightening pulse generator indicated by block 108 is shown in Fig. 2 to which reference is now made. The circuit employs a vacuum tube 201. Control grid 202 is the input circuit of tube 201. The output circuit of tube 201 is at its anode 203. A capacitor 204 is coupled to grid circuit 202. A resistor 205 is connected to grid 202. Resistors 206 and 207 are connected in series as a voltage divider. The junction of resistors 206 and 207 is connected to resistor 205. Resistor 207 is connected to a source of negative bias potential with respect to ground at terminal 208 and resistor 206 is connected to ground at 209. The cathode 210 of tube 201 is connected to ground. A capacitor 211 is connected as a by-pass filter for the negative bias voltage in parallel with resistor 206. A variable inductor 212 is connected at one of its terminals to anode 203. The other terminal of inductor 212 is connected to a source of B+ potential 213. Diode rectifier 216 is connected across inductor 212. The diode rectifier is poled to short circuit positive going signals developed in the anode coil 212. Resistors 218 and 219 are connected as a voltage divider between a positive voltage point at the B+ end of inductor 212 and ground. The screen 221 of tube 201 is connected to the junction of resistors 218 and 219. An A.-C. by-pass capacitor 220 is connected from screen 221 to ground. There is an output connection 222 to the anode circuit 203 of tube 201.

Referring again to Fig. 1 the operation of the pulse edge brightening system of this invention may be followed.

A pulse such as 100, intended to be applied to the vertical deflection circuit 109 of cathode ray tube 110 for display on its fluorescent screen 124 is first delayed through delay line 101 and then amplified in amplifier 102. Delay line 101 in one use of the invention has been a 25 foot section of 73 ohm impedance coaxial cable such as that bearing the JAN designation RG–59/U. The dimensions of this cable are: inner conductor diameter 0.0253" and outer conductor diameter 0.146" ±.005. These dimensions are based upon a polyethylene dielectric material between the inner conductor and outer conductor. This provided a delay of the order of .05 microsecond. Other delay means may be used to provide other desired delay intervals. It is a delayed version of the initial pulse 100 that is applied to the deflection circuit 109 of cathode ray tube 110. Pulse 100 is applied to the input circuit of cathode follower 103. Cathode follower 103 is inserted to avoid undue loading of the input circuit of the system of this invention. A differentiator 104 of well known type comprising a series capacitor and a shunt resistor is connected in the output circuit of the cathode follower 103. The pulse 114 resulting from the action of differentiator 104 is applied to an amplifier 105. The amplified pulse 123 is applied to full wave rectifier 106. The resulting rectified pulses 115 are applied to an amplifier. The amplified pulses 122 are applied to brightening pulse generator 108.

The circuit details of brightening pulse generator 108 are shown in Fig. 2. In the output circuit of brightening pulse generator 108 pulses 116 are generated. The pulses 116 are applied to the cathode 111 of the cahtode ray tube 110. The time interval between the leading edge of initial pulse 100 applied to cathode follower 103 and the first of the pulses 116 applied to the cathode 111 of cathode ray tube 110 corresponds to the delay interval imposed upon pulse 100 by delay line 101 and amplifier 102. Accordingly, therefore, the cathode 111 receives the first of pulses 116 at the same time as the deflection circuit 109 receives the leading edge of delayed version of pulse 100. In this way the rapidly rising portion of the delayed version of pulse 100 and the sharp increase in intensity of the cathode ray beam of cathode ray tube 110 are made to coincide in time.

It is to be noted that as a result of the operation of differentiator 104, both a positive going leading edge 117 and a negative going leading edge 118 are generated in pulse 114 for the rise 119 and fall 120, respectively, of pulse 100. In full wave rectifier 106 both the rising and falling pulses 117 and 118 are translated into positive going pulses 115. Pulses 115 are applied to amplifier 107 to produce amplified pulses 122.

Referring now to Fig. 2 wherein the circuit details are shown of the brightening pulse generator generally indicated by block 108, Fig. 1, it may be seen that the pulses 122 are applied to the grid circuit 202 of tube 201 through capacitor 204. Tube 201 is biased at plate current cut off so that the tube will conduct sharply when the pulses 122 are impressed thereon. The rapid rise in plate current through inductor 212, which is resonant at about 15 megacycles in one embodiment used as an example, results in an oscillation at the self-resonant frequency of the inductor 212. The resonant frequency of inductor 212 may be adjusted to result in a pulse duration for pulses 116 which corresponds to the anticipated rise and fall time of the delayed version of pulse 110 after passing through amplifier 102. After the first negative half cycle of the oscillation, rectifier diode 216 presents a low impedance to the resonant circuit thus damping out the oscillation. Thus, there will appear at terminal 222 only the first sharp negative going voltage pulse with a duration (for the 15 megacycle example, above) of less than .04 microsecond. This negative brightening pulse (as at 116) is applied to the cathode 111 of the cathode ray tube of Fig. 1. The negative pulse 116 makes the cathode of the cathode ray tube more negative, lowering thereby the grid bias and increasing the beam intensity and consequently increasing the brightness of the trace on the cathode ray screen for each negative excursion of pulse 116. There are two brightening pulses 116 for each signal pulse 100. Accordingly, it may be seen that a rapid increase in intensity will be effected at cathode ray tube 110 for both the rising portion 119 and the falling portion 120 of the desired pulse 110 when displayed on the cathode ray tube screen.

There has been recited in the foregoing description a preferred embodiment of this invention. The specific recitations given therein are for the purposes of description only and are not intended to limit the scope of this invention. It is understood that there may be numerous other embodiments which fall in the spirit of this invention, and therefore this invention is limited only by the scope of the appended claims taken in view of the prior art.

What is claimed is:

1. In a cathode ray oscillograph, a pulse edge brightening circuit comprising a source of pulse signals for display on the oscillograph; a first channel including a delay means connected to said source; a second channel including a differentiating means connected to said source, said second channel also including a pulse edge brightening means connected to said differentiating means; and a cathode ray indicator having an intensity control means for the cathode ray and a deflection means for the cathode ray, said first channel being connected to said deflection means and said second channel being connected to said intensity control means, whereby said pulse edge brightening means increases the intensity of said cathode ray during the rise and fall of amplitude of said pulse signals.

2. A pulse edge brightening system for cathode ray oscillographs comprising: an input circuit coupled to a source of pulses for display on a cathode ray oscillograph screen; first means coupled to said input circuit responsive to said pulses for generating a control pulse for each leading and each trailing edge, respectively, of the pulses from said source; second means also coupled to said input circuit, for delaying said pulses impressed thereon, third means connected to said first means for producing a brightening pulse for each control pulse; and a cathode ray indicator connected to said third and said second means for receiving said brightening pulses and said delayed pulses in time coincidence, whereby said brightening pulses occur simultaneously with the leading edge and trailing edge of said pulses when displayed on said cathode ray indicator.

3. A pulse edge brightening circuit comprising a source of pulse signals, first means coupled to said source for delaying said pulse signals a predetermined time; second means coupled to said source for developing a control pulse in response to each change in amplitude of said pulse signals; third means coupled to said second means for producing a brightening pulse for each control pulse; and indicating cathode ray means having a deflection circuit coupled to said first means and an intensity control circuit coupled to said third means, said first means having a delay duration equal to the interval during which said brightening pulses are developed by said second means, whereby brightening pulses are applied to said indicating means simultaneously with each change in amplitude of said pulse signals to brighten the leading and trailing edges of said pulse signals when displayed on said cathode ray indicator.

4. A pulse edge brightening system for cathode ray oscillographs for use in conjunction with a source of pulse signals, said system comprising: a first means for delaying and amplifying the pulse signals received from the source of said pulse signals; a second means having a common input circuit with said first means, said second means including a circuit for receiving said pulse signals and developing therefrom a sharp brightening pulse for each leading edge and each trailing edge, respectively, of said pulse signals; and a cathode ray indicator tube, having a first circuit for intensity control of the beam of said indicator tube in response to said sharp brightening pulses applied to said first circuit, and a second circuit for deflecting the beam of said indicator in response to said pulse signals applied to said second circuit, said first circuit being coupled to said second means and said second circuit being coupled to said first means, whereby said first means delays said pulse signals while said second means develops said brightening pulses, and whereby said brightening pulses are applied to said first circuit to intensify the beam of said cathode ray tube during the occurrence of said leading edges and said trailing edges of said pulse signals when said pulse signals are applied to said second circuit.

5. A pulse edge brightening circuit for cathode ray oscillographs comprising an input circuit for pulse signals; a delay line coupled to said input circuit for delaying said pulse signals; an amplifier coupled to said delay line for amplifying said delayed pulse signals; an isolation amplifier also coupled to said input circuit; a differentiating network coupled to said isolation amplifier for developing a positive going pulse for each positive excursion of said pulse signals and a negative going pulse for each negative excursion of said pulse signals; a full wave rectifier coupled to said differentiating network for receiving said negative going and said positive going pulses and producing a pair of pulses therefrom, said pair having identical polarities for generating a very sharp brightening pulse for each of said identically polarized pulses; and a cathode ray indicator tube having an intensity control circuit and a deflection circuit, said intensity control circuit being coupled to said brightening pulse generating means, said deflection circuit being coupled to said amplifier for receiving said delayed pulse signals, whereby said brightening pulses occur simultaneously with the leading and trailing edges of said pulse signals to increase the brightness of the cathode ray tube during the intervals of rising and falling of the pulse signals displayed on said cathode ray tube, thereby providing a uniform display intensity for all parts of said pulse signals.

References Cited in the file of this patent

UNITED STATES PATENTS

| | | |
|---|---|---|
| 2,465,364 | Ferrar | Mar. 29, 1949 |
| 2,477,615 | Isbister | Aug. 2, 1949 |
| 2,480,837 | Busignies | Sept. 6, 1949 |
| 2,492,700 | Jeanne | Dec. 27, 1949 |
| 2,604,622 | Hasbrook | July 22, 1952 |